(12) United States Patent
Yan et al.

(10) Patent No.: US 11,812,463 B2
(45) Date of Patent: Nov. 7, 2023

(54) PREAMBLE BASED ACCESS FOR AN UPLINK TRANSMISSION

(71) Applicant: Lenovo Innovations Limited (Hong Kong), Hong Kong (CN)

(72) Inventors: Zhi Yan, Beijing (CN); Xiaodong Yu, Beijing (CN); Xinghua Song, Beijing (CN); Chenxi Zhu, Beijing (CN)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 619 days.

(21) Appl. No.: 16/321,421

(22) PCT Filed: Jul. 27, 2016

(86) PCT No.: PCT/CN2016/091953
§ 371 (c)(1),
(2) Date: Jan. 28, 2019

(87) PCT Pub. No.: WO2018/018472
PCT Pub. Date: Feb. 1, 2018

(65) Prior Publication Data
US 2021/0282175 A1 Sep. 9, 2021

(51) Int. Cl.
*H04W 74/00* (2009.01)
*H04L 5/00* (2006.01)
(Continued)

(52) U.S. Cl.
CPC ......... *H04W 74/004* (2013.01); *H04L 5/0044* (2013.01); *H04L 5/0055* (2013.01);
(Continued)

(58) Field of Classification Search
None
See application file for complete search history.

(56) References Cited

U.S. PATENT DOCUMENTS

2002/0114294 A1* 8/2002 Toskala ............... H04W 72/04
370/329
2009/0252125 A1* 10/2009 Vujcic ............... H04W 56/0045
370/336
(Continued)

FOREIGN PATENT DOCUMENTS

| CN | 102202412 A | 9/2011 |
|---|---|---|
| CN | 104254135 A | 12/2014 |
| WO | 2014/146300 A1 | 9/2014 |

OTHER PUBLICATIONS

3GPP, 3rd Generation Partnership Project; Technical Specification Group Radio Access Network; Evolved Universal Terrestrial Radio Access (E-UTRA); Study on latency reduction techniques for LTE (Release 13), 3GPP TR 36.881 V0.0.1, May 2015, pp. 1-7.
(Continued)

*Primary Examiner* — Jutai Kao
(74) *Attorney, Agent, or Firm* — Kunzler Bean & Adamson

(57) ABSTRACT

Apparatuses, methods, and systems are disclosed for uplink transmissions. One apparatus includes a processor that generates a preamble sequence for an uplink transmission. The preamble sequence of the apparatus includes indication information. The apparatus includes a transmitter that transmits the preamble sequence. The transmitter transmits uplink information based on the indication information.

17 Claims, 7 Drawing Sheets

(51) Int. Cl.
*H04W 72/044* (2023.01)
*H04W 74/08* (2009.01)
*H04W 4/70* (2018.01)

(52) U.S. Cl.
CPC ... *H04W 72/0466* (2013.01); *H04W 74/0833* (2013.01); *H04W 4/70* (2018.02)

(56) References Cited

U.S. PATENT DOCUMENTS

| | | | | |
|---|---|---|---|---|
| 2010/0246510 | A1* | 9/2010 | Ishii | H04W 74/008 |
| | | | | 370/329 |
| 2012/0069809 | A1 | 3/2012 | Aminaka et al. | |
| 2013/0301611 | A1* | 11/2013 | Baghel | H04W 72/04 |
| | | | | 370/331 |
| 2014/0079011 | A1* | 3/2014 | Wiberg | H04W 74/006 |
| | | | | 370/329 |
| 2015/0223181 | A1* | 8/2015 | Noh | H04W 52/50 |
| | | | | 370/329 |
| 2015/0289288 | A1* | 10/2015 | Jung | H04L 5/023 |
| | | | | 370/336 |
| 2015/0289292 | A1* | 10/2015 | Sun | H04L 5/0092 |
| | | | | 370/329 |
| 2017/0019930 | A1* | 1/2017 | Lee | H04W 72/1284 |
| 2017/0367120 | A1* | 12/2017 | Murray | H04W 74/0833 |
| 2020/0329502 | A1* | 10/2020 | Beale | H04W 74/0833 |

OTHER PUBLICATIONS

Ki-Dong Lee et al., "Throughput comparison of random access methods for M@M service over LTE networks", 2011 IEEE GLOBECOM Workshops (GC Wkshps) Dec. 5-9, 2011, pp. 1-2.
PCT, "International Search Report", PCT/CN2016/091953, dated Mar. 24, 2017, pp. 1-3.
PCT, "Written Opinion of the International Searching Authority", PCT/CN2016/091953, dated Mar. 24, 2017, pp. 1-3.

* cited by examiner

PREAMBLE BASED ACCESS FOR AN UPLINK TRANSMISSION

FIELD

The subject matter disclosed herein relates generally to wireless communications and more particularly relates to a preamble based access for an uplink transmission.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Downlink Control Information ("DCI"), Downlink ("DL"), Downlink Pilot Time Slot ("DwPTS"), Enhanced Clear Channel Assessment ("eCCA"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Licensed Assisted Access ("LAA"), Load Based Equipment ("LBE"), Listen-Before-Talk ("LBT"), Long Term Evolution ("LTE"), Negative-Acknowledgment ("NACK") or ("NAK"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Round Trip Time ("RTT"), Receive ("RX"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, there are two ways to initiate uplink transmission. One way to initiate uplink transmission is by using SR based PUSCH transmission. Another way to initiate uplink transmission is by using RACH based PUSCH transmission. For SR based PUSCH transmission, before a UE transmits uplink data to an eNB, the UE sends a SR if the eNB has configured the SR in RRC. The SR may be transmitted on at least one PUCCH resource. In certain configurations, if the UE receives an UL grant from the eNB after the SR transmission, a UL-SCH is transmitted according to the UL grant.

In some configurations, if a UE is not configured with SR information, is in a RRC_IDEL state, or loses synchronization, the UE may start a RACH procedure to obtain a new connection to the network.

In various configurations, a RACH procedure includes an exchange of four different messages between a UE and an eNB. A first message may include a randomly selected preamble sent in an available resource according to an SIB2 configuration. In a second message, the eNB replies with the random access response ("RAW") to all detected preambles. Step 3: If the second message is received, it includes uplink grant information, pointing to the RB where a third message including a connection request should be sent. Upon reception of the connection request, the eNB transmits a fourth message including a contention resolution message as an answer to the third message.

Massive machine type communication ("MTC"), such as in wide area sensor networks, mission critical MTC, industrial applications, may be considered important. Existing technologies know as LTE have been designed to support high data rates, particular in the downlink, and high velocities for a small number of UEs per radio cell.

However, new types of services may have different characteristics and requirements. In a massive MTC scenario, multiple sensor nodes sporadically transmit small uplink data payloads (e.g., temperature measurements). Moreover, an increasing number of applications installed on smart phones generate traffic with similar properties. In the case of LTE, each small data packet comes along with a cascade of signaling messages in both directions for connection setup and request of radio resources. Signaling overhead is a more significant part of over-the-air transmissions for such transmission cases, and a large portion of the device power consumption. So SR based uplink transmission and RACH based uplink transmission may not be suitable for massive MTC scenarios.

BRIEF SUMMARY

Apparatuses for uplink transmissions are disclosed. Methods and systems also perform the functions of the apparatus. In one embodiment, the apparatus includes a processor that generates a preamble sequence for an uplink transmission. In such an embodiment, the preamble sequence includes indication information. In various embodiments, the apparatus includes a transmitter that transmits the preamble sequence. In some embodiments, the transmitter transmits uplink information based on the indication information.

In one embodiment, the uplink information includes one or more of control information and data information. In such an embodiment, the control information includes one or more of a remote unit identification, a buffer status report, and a hybrid automatic repeat request process number. In a further embodiment, a mapping relationship between the preamble sequence and the indication information is predefined or received from an external device. In some embodiments, the indication information indicates one or more of a transmission resource assignment, a new data indicator, a transmit power control command, a modulation and coding scheme reference signal, configuration information, an acknowledgement and non-acknowledgement resource assignment, a multiple access code, and a scrambled code. In such an embodiment, the apparatus includes a receiver that receives acknowledgement or non-acknowledgement feedback information corresponding to the transmission of the uplink information. In certain embodiments, the uplink information is transmitted using the multiple access code. In some embodiments, the uplink information is scrambled by the scrambled code.

A method for uplink transmissions, in one embodiment, includes generating a preamble sequence for an uplink transmission. In such an embodiment, the preamble sequence includes indication information. In various embodiments, the method includes transmitting the preamble sequence. In some embodiments, the method includes transmitting uplink information based on the indication information.

In one embodiment, an apparatus includes a receiver that receives a preamble sequence. In such an embodiment, the preamble sequence is for an uplink transmission and includes indication information. In some embodiments, the receiver receives uplink information based on the indication information.

In one embodiment, the uplink information includes one or more of control information and data information. In such an embodiment, the control information includes one or more of a remote unit identification, a buffer status report, and a hybrid automatic repeat request process number. In a further embodiment, a mapping relationship between the preamble sequence and the indication information is predefined or transmitted from the apparatus. In some embodiments, the indication information indicates one or more of a transmission resource assignment, a new data indicator, a transmit power control command, a modulation and coding scheme reference signal, configuration information, an acknowledgement and non-acknowledgement resource assignment, a multiple access code, and a scrambled code. In such an embodiment, the apparatus includes a transmitter that transmits acknowledgement or non-acknowledgement feedback information corresponding to the reception of the uplink information. In certain embodiments, the uplink information is received using the multiple access code. In some embodiments, the uplink information is scrambled by the scrambled code.

A method for uplink transmissions, in one embodiment, includes receiving a preamble sequence. In such an embodiment, the preamble sequence is for an uplink transmission and includes indication information. In some embodiments, the method includes receiving uplink information based on the indication information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
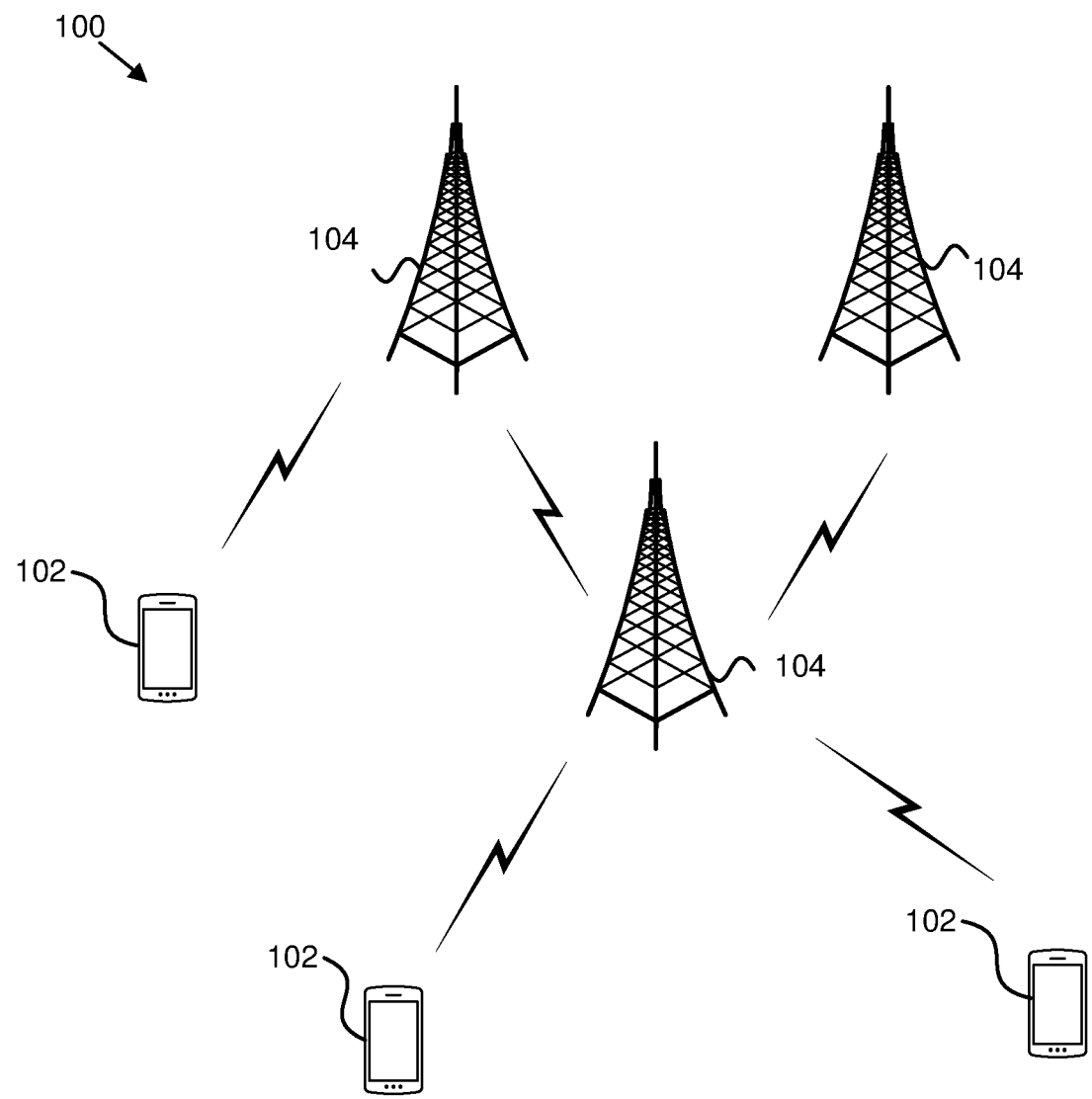
FIG. 1 is a schematic block diagram illustrating one embodiment of a wireless communication system for uplink transmissions.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for uplink transmissions. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may generate a preamble sequence for an uplink transmission. The preamble sequence may include indication information. The remote unit 102 may transmit the preamble sequence. The remote unit 102 may also transmit uplink information based on the indication information. Accordingly, a remote unit 102 may transmit uplink transmissions.

In another embodiment, a base unit 104 may receive a preamble sequence. The preamble sequence may be for an uplink transmission and include indication information. In some embodiments, the base unit 104 may receive uplink information based on the indication information. Accordingly, a base unit 104 may receive uplink transmissions.

Figure 2:
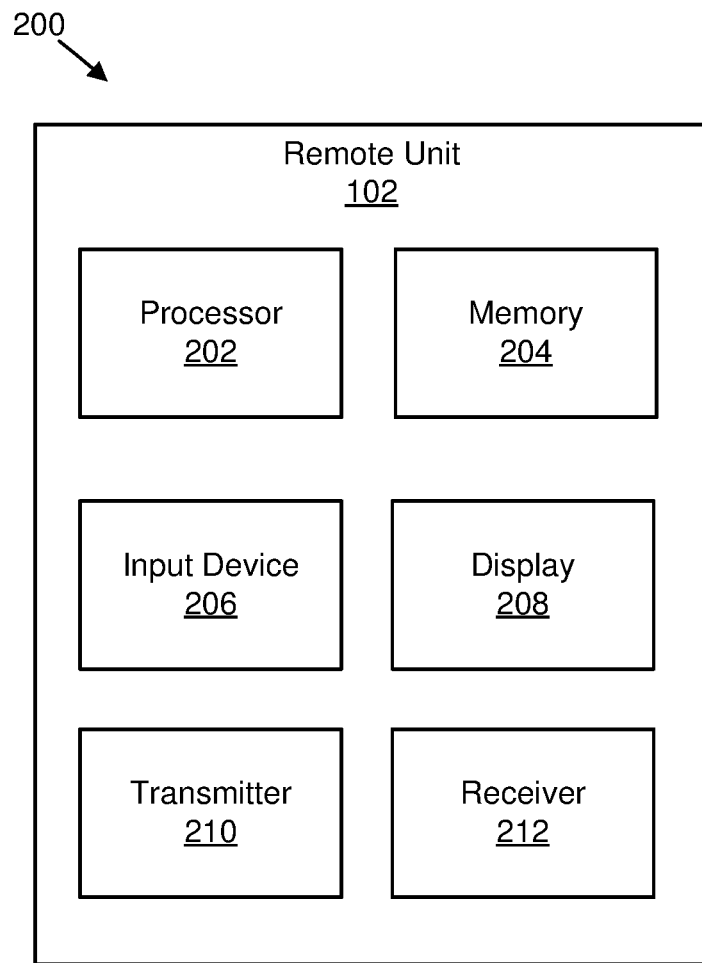
FIG. 2 is a schematic block diagram illustrating one embodiment of an apparatus that may be used for transmitting uplink transmissions.

FIG. 2 depicts one embodiment of an apparatus 200 that may be used for transmitting uplink transmissions. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212. In certain embodiments, the processor 202 may generating a preamble sequence for an uplink transmission. The preamble sequence may include indication information.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to an indication to be provided to another device. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 is used to transmit a preamble sequence, and to transmit uplink information based on indication information of the preamble sequence. In certain embodiments, the receiver 212 may be used to receive data. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
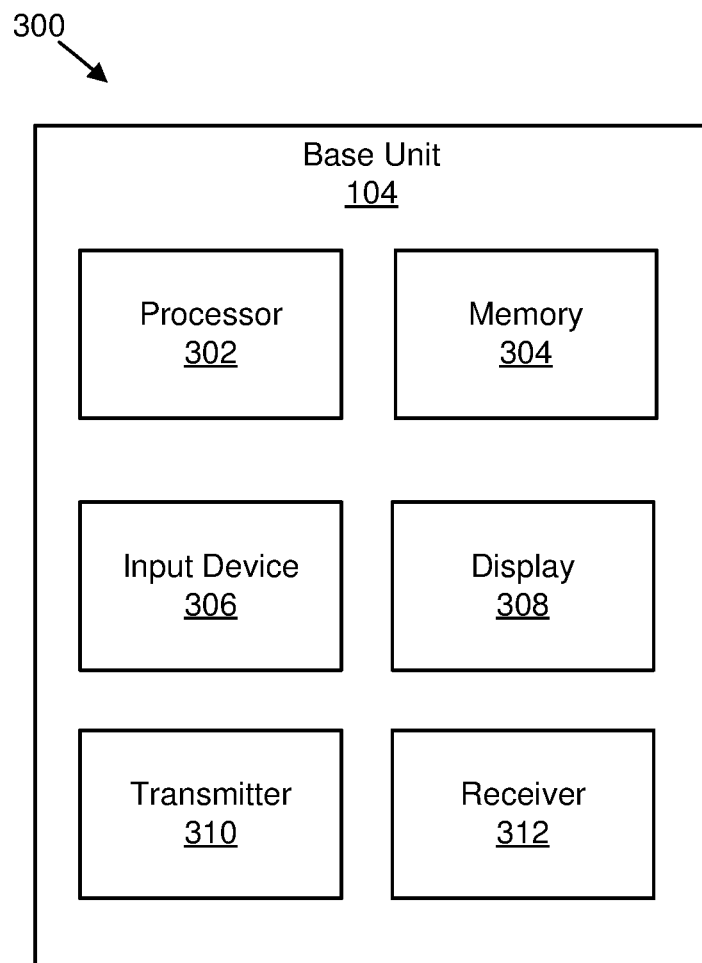
FIG. 3 is a schematic block diagram illustrating one embodiment of an apparatus that may be used for receiving uplink transmissions.

FIG. 3 depicts one embodiment of an apparatus 300 that may be used for receiving uplink transmissions. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, and the display 308 may be substantially similar to the processor 202, the memory 204, the input device 206, and the display 208 of the remote unit 102, respectively.

The receiver 312 is used to receive a preamble sequence. The preamble sequence may be for a uplink transmission and may include indication information. The receiver 312 may also be used to receive uplink information based on the indication information. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
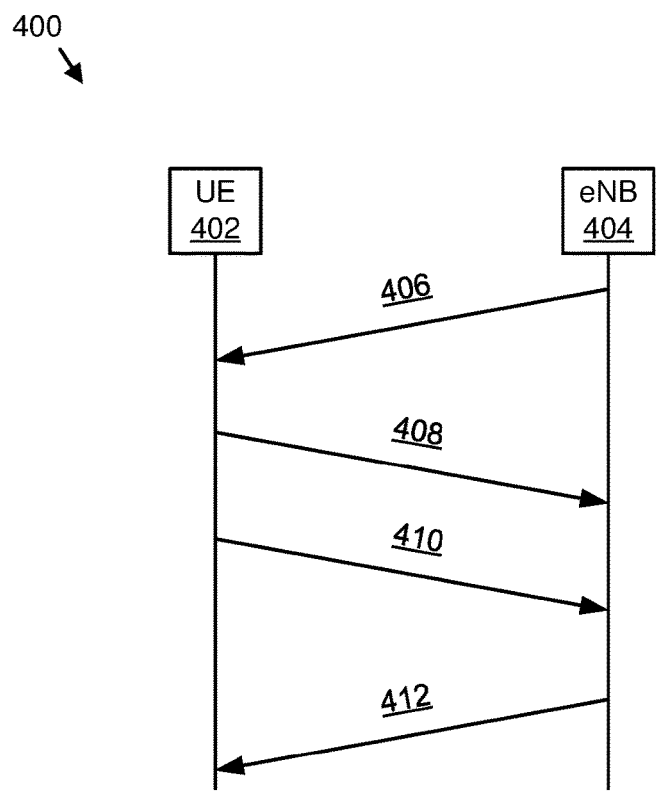
FIG. 4 illustrates one embodiment of communications for transmitting uplink transmissions.

FIG. 4 illustrates one embodiment of communications 400 for transmitting uplink transmissions. Specifically, communications 400 between a UE 402 and an eNB 404 are illustrated. A first communication 406 includes RRC configuration transmitted from the eNB 404 and received by the UE 402. In some embodiments, the RRC configures an access occasion, a preamble sequence, uplink grant information configuration, a relationship, and/or a multiple access ("MA") code.

In certain embodiments, the preamble sequence configured by the RRC may be a RACH preamble sequence. In various embodiments, there may be 64 different RACH preamble sequences available, while in some embodiments, there may be fewer or greater than 64 different RACH preamble sequences. In some embodiments, the RACH preamble sequences may be Zadoff-Chu sequences. In one embodiment, the preamble sequence configured by the RRC may be an M sequence plus a Zadoff-Chu sequence to support a large number of UEs. In certain embodiments, if preamble sequences would affect legacy systems, other sequences may be used such as a new Zadoff-Chu sequence with a different length. In some embodiments, only one sequence with different time-frequency transmission is assumed to be a different preamble sequence.

In various embodiments, the uplink grant information configured by the RRC may be linked with the preamble sequence by code, time, and/or frequency. In some embodiments, the uplink grant information may include information indicating a transmission resource assignment, a new data indicator, a transmit power control command, a modulation and coding scheme reference signal, configuration information, an acknowledgement and non-acknowledgement resource assignment, a multiple access code, and/or a scrambled code. The information may be indicated explicitly in the preamble sequence and/or the information may be indicated implicitly by the preamble sequence, such as by a predetermined mapping between the preamble sequence and the uplink grant information. In some embodiments, a mapping between a preamble sequence and uplink grant information may be determined by dynamic signaling configuration, pre-configuration, and/or by being predetermined, such as in a specification. In certain embodiments, the multiple access code may be indicated by the preamble sequence if code based non-orthogonal access is used in uplink transmissions.

A second communication 408 includes the preamble sequence being transmitted from the UE 402 (e.g., remote unit 102) and received by the eNB 404 (e.g., base unit 104). In various embodiments, the UE 402 may randomly select one preamble sequence and transmit the preamble sequence in the predefined access occasion as predefined by the RRC configuration. In some embodiments, the preamble sequence may be used for timing and/or frequency synchronization.

A third communication 410 includes uplink information. In certain embodiments, the uplink information includes control information and/or data information. In one embodiment, without a response to the second communication 408 by the eNB 404, the UE 402 transmits the uplink information. In various embodiments, the uplink information may be transmitted in the uplink resource indicated by the preamble sequence and/or with the multiple access code indicated by the preamble sequence. In some embodiments, the uplink information may be transmitted with a combined or a separated coded packet in the same or different uplink resource based on indication information of the preamble sequence. In certain embodiments, the uplink information may be scrambled based on indication information of the preamble sequence. For example, an index corresponding the preamble sequence may be used to initialize a bit sequence and the uplink information may be scrambled using the bit sequence.

In one embodiment, control information of the uplink information includes a UE identification ("ID"), a buffer status report, and a hybrid automatic repeat request process number. In certain embodiments, control information is not transmitted from the UE 402, but is indicated, predefined, preconfigured, or determined another way. In some embodiments, such as if the UE 402 has a cell radio network temporary identifier ("C-RNTI"), a UE ID may be the C-RNTI. In various embodiments, such as if the UE 402 does not have a C-RNTI, a UE ID may be a random ID, an implicitly indicated ID, or an explicitly indicated ID. In one embodiment, the preamble sequence and the uplink information may be transmitted in the same transmission time interval ("TTI") and/or subframe. For example, in a single subframe, the preamble sequence may be transmitted followed closely by the uplink information.

A fourth communication 412 includes an acknowledgement ("ACK") or non-acknowledgement ("NACK") transmitted from the eNB 404 to the UE 402 to indicate ACK/NACK of the uplink information. In certain embodiments, the UE 402 may wait to receive the ACK/NACK information, or wait for a timer to expire and start a new RACH procedure. In some embodiments, the ACK/NACK may be transmitted in a predefined resource or transmitted in a resource indicated by the preamble sequence. In various embodiments, the ACK/NACK may be transmitted in a downlink control channel, PHICH, among others. In various embodiments, if the UE 402 does not receive the ACK/NACK without a predetermined time period, a new access procedure may be started.

By performing transmissions as described herein (e.g., with a grant-free based uplink transmission) may improve connection efficiency, reduce signaling overhead, and/or latency reduction that may be used for massive MTC and/or critical MTC.

Figure 5:
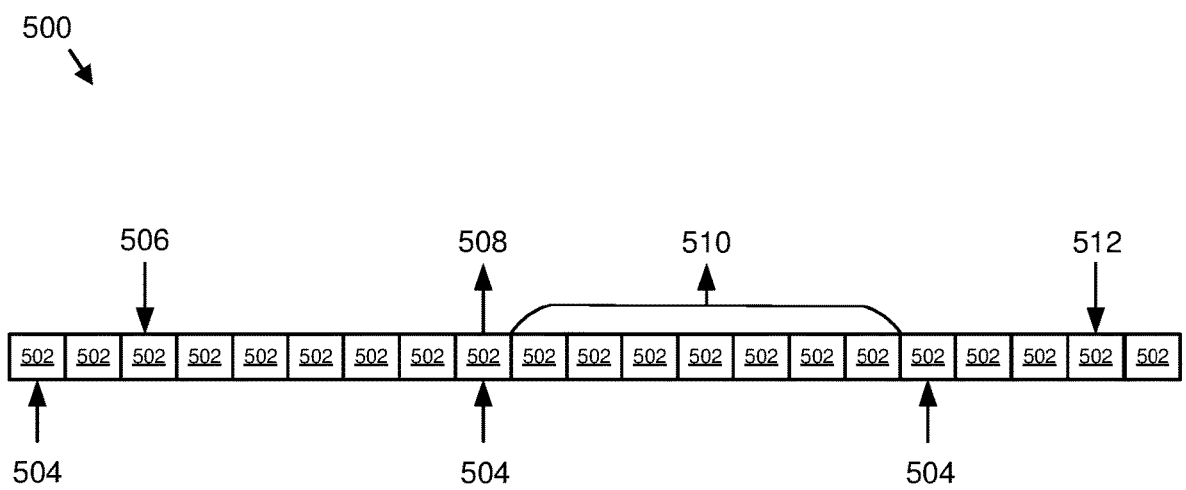
FIG. 5 illustrates one embodiment of uplink transmission timing.

FIG. 5 illustrates one embodiment of uplink transmission timing 500. Specifically, multiple communications 502 are illustrated. In one embodiment, the communications 502 may be equated with one or more subframes. Furthermore, multiple access possibilities 504 are illustrated among the multiple communications 502. Moreover, in some embodiments, a first communication 506 is transmitted from the base unit 104 to the remote unit 102 and includes RRC configuration. The first communication 506 may be substantially similar to the first communication 406.

In certain embodiments, a second communication 508 is transmitted from the remote unit 102 to the base unit 104 and includes a preamble sequence. The second communication 508 may be substantially similar to the second communication 408. In various embodiments, a third communication 510 is transmitted from the remote unit 102 to the base unit 104 and includes uplink information. As illustrated, the third communication 510 may be transmitted over multiple of the communications 502. The third communication 510 may be substantially similar to the third communication 410. In some embodiments, a fourth communication 512 is transmitted from the base unit 104 to the remote unit 102 and includes an ACK/NACK. The fourth communication 512 may be substantially similar to the fourth communication 412.

Figure 6:
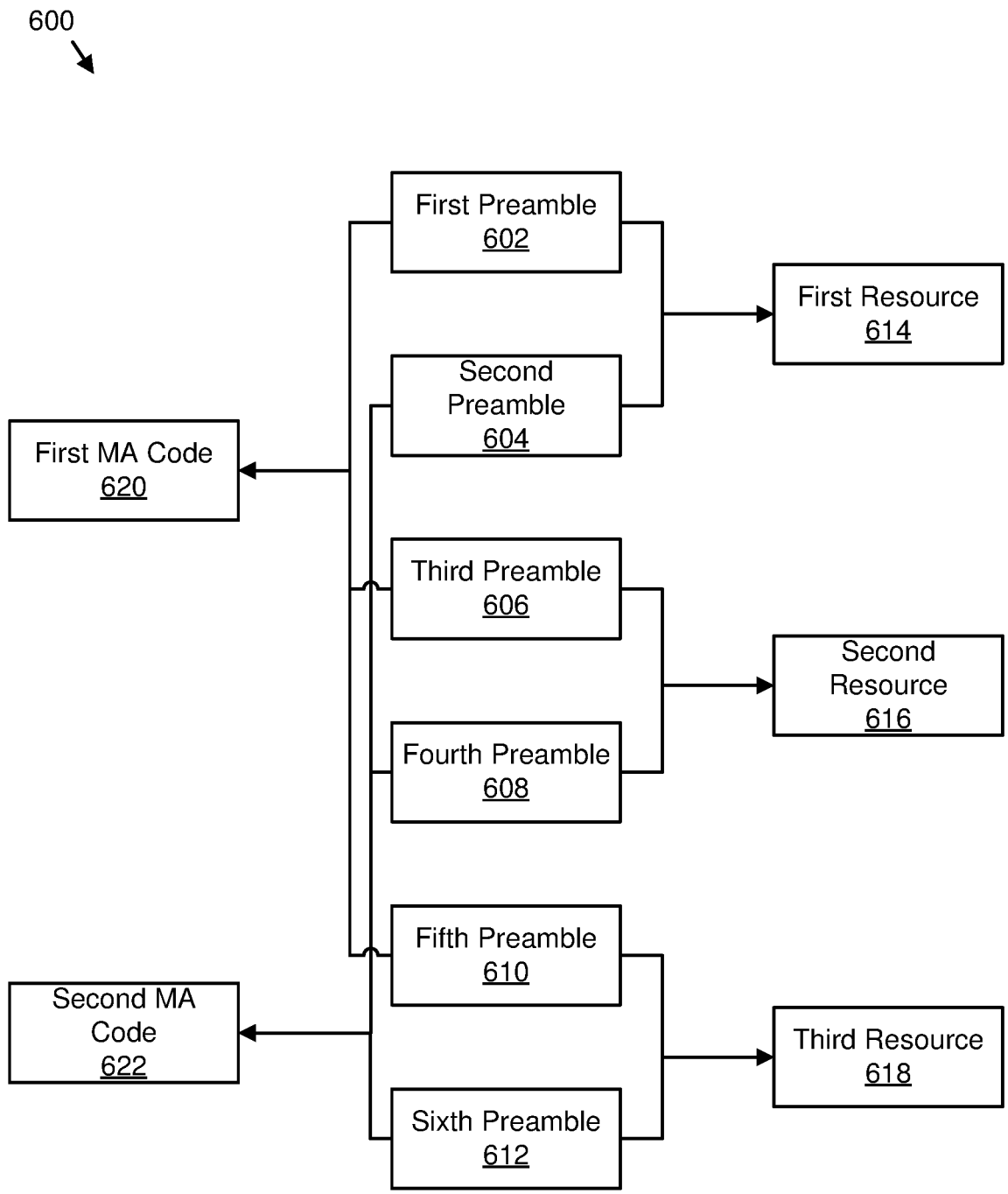
FIG. 6 is a schematic block diagram illustrating one embodiment of resource assignment and coding for uplink transmissions.

FIG. 6 is a schematic block diagram illustrating one embodiment of resource assignment and coding 600 for uplink transmissions. Specifically, a first preamble 602, a second preamble 604, a third preamble 606, a fourth preamble 608, a fifth preamble 610, and a sixth preamble 612 are illustrated. The first and second preambles 602 and 604 may use a first resource 614, the third and fourth preambles 606 and 608 may use a second resource 616, and the fifth and sixth preambles 610 and 612 may use a third resource 618. To distinguish between the different preambles transmitted using a same resource, a first MA code 620 and a second MA code 622 are used. Specifically, the first, third, and fifth preambles 602, 606, and 610 may use the first MA code 620. Moreover, the second, fourth, and sixth preambles 604, 608, and 612 may use the second MA code 622. The resources and MA codes may be allocated as set forth above in FIG. 4.

Figure 7:
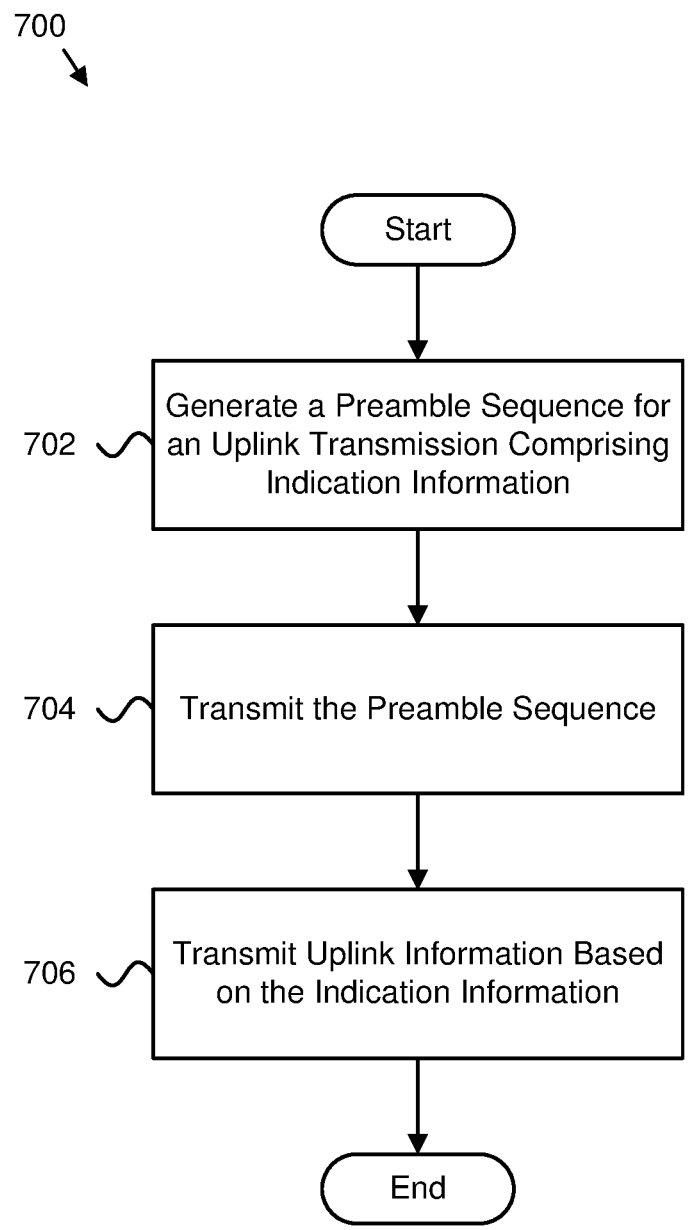
FIG. 7 is a schematic flow chart diagram illustrating one embodiment of a method for transmitting an uplink transmission.

FIG. 7 is a schematic flow chart diagram illustrating one embodiment of a method 700 for transmitting an uplink transmission. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include generating 702 a preamble sequence for an uplink transmission. The preamble sequence may include indication information. In some embodiments, the indication information indicates one or more of a transmission resource assignment, a new data indicator, a transmit power control command, a modulation and coding scheme reference signal, configuration information, an acknowledgement and non-acknowledgement resource assignment, a multiple access code, and a scrambled code. In such an embodiment, the apparatus includes a receiver that receives acknowledgement or non-acknowledgement feedback information corresponding to the transmission of the uplink information. In certain embodiments, the uplink information is transmitted using the multiple access code. In some embodiments, the uplink information is scrambled by the scrambled code.

The method 700 may also include transmitting 704 the preamble sequence. The method 700 may include transmitting 706 uplink information based on the indication information, and the method 700 may end. In one embodiment, the uplink information includes one or more of control information and data information. In such an embodiment, the control information includes one or more of a remote unit identification, a buffer status report, and a hybrid automatic repeat request process number. In a further embodiment, a mapping relationship between the preamble sequence and the indication information is predefined (e.g., via specification, preconfigured) or received from an external device (e.g., base unit 104).

Figure 8:
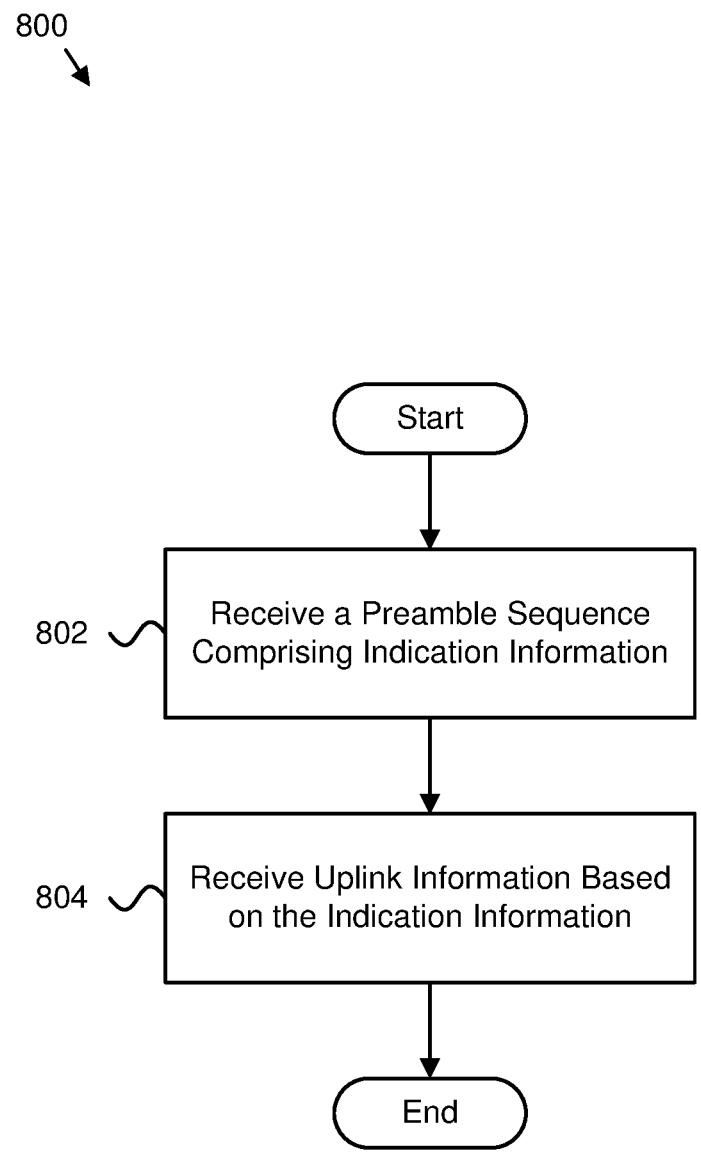
FIG. 8 is a schematic flow chart diagram illustrating one embodiment of a method for receiving an uplink transmission.

FIG. 8 is a schematic flow chart diagram illustrating one embodiment of a method 800 for receiving an uplink transmission. In some embodiments, the method 800 is performed by an apparatus, such as the base unit 104. In certain embodiments, the method 800 may be performed by a processor executing program code, for example, a microcontroller, a microprocessor, a CPU, a GPU, an auxiliary processing unit, a FPGA, or the like.

The method 800 may include receiving 802 a preamble sequence. The preamble sequence may be for an uplink transmission and may include indication information. In some embodiments, the indication information indicates one or more of a transmission resource assignment, a new data indicator, a transmit power control command, a modulation and coding scheme reference signal, configuration information, an acknowledgement and non-acknowledgement resource assignment, a multiple access code, and a scrambled code. In such an embodiment, the apparatus includes a transmitter that transmits acknowledgement or non-acknowledgement feedback information corresponding to the reception of the uplink information. In certain embodiments, the uplink information is received using the multiple access code. In some embodiments, the uplink information is scrambled by the scrambled code.

In various embodiments, the method 800 includes receiving 804 uplink information based on the indication information, and the method 800 may end. In one embodiment, the uplink information includes one or more of control information and data information. In such an embodiment, the control information includes one or more of a remote unit identification, a buffer status report, and a hybrid automatic repeat request process number. In a further embodiment, a mapping relationship between the preamble sequence and the indication information is predefined (e.g., via specification, preconfigured) or transmitted from the apparatus (e.g., base unit 104).

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a processor that:
maps, at the apparatus, each random access preamble sequence of a plurality of random access preamble sequences to corresponding indication information, wherein the indication information indicates at least two features selected from a group comprising a transmission resource assignment, a new data indicator, a transmit power control command, a modulation and coding scheme reference signal, and an acknowledgement and non-acknowledgement resource assignment corresponding to a respective random access preamble sequence of the plurality of random access preamble sequences;
generates a random access preamble sequence of the plurality of random access preamble sequences to establish a random access channel for an uplink transmission, wherein the random access preamble sequence implicitly indicates the indication information corresponding to the random access preamble sequence; and
a transmitter that:
transmits the random access preamble sequence to a base station; and
without receiving a response from the base station to the transmission of the random access preamble sequence, transmits uplink information separate from the random access preamble sequence based on the indication information in the random access preamble sequence.

2. The apparatus of claim 1, further comprising a receiver that receives acknowledgement or non-acknowledgement feedback information corresponding to the transmission of the uplink information.

3. The apparatus of claim 1, wherein the uplink information is transmitted using a multiple access code.

4. The apparatus of claim 1, wherein the uplink information is scrambled by a scrambled code.

5. A method at a user equipment (UE), the method comprising:
mapping each random access preamble sequence of a plurality of random access preamble sequences to corresponding indication information, wherein the indication information indicates at least two features selected from a group comprising a transmission resource assignment, a new data indicator, a transmit power control command, a modulation and coding scheme reference signal, and an acknowledgement and non-acknowledgement resource assignment corresponding to a respective random access preamble sequence of the plurality of random access preamble sequences;
generating a random access preamble sequence of the plurality of random access preamble sequences to establish a random access channel for an uplink transmission, wherein the random access preamble sequence comprises implicitly indicates the indication information corresponding to the random access preamble sequence;
transmitting the random access preamble sequence to a base station; and
without receiving a response from the base station to the transmission of the random access preamble sequence, transmitting uplink information separate from the random access preamble sequence based on the indication information in the random access preamble sequence.

6. The method of claim 5, wherein the uplink information comprises one or more of control information and data information.

7. The method of claim 6, wherein the control information comprises one or more of a remote unit identification, a buffer status report, and a hybrid automatic repeat request process number.

8. The method of claim 5, wherein a mapping relationship between the random access preamble sequence and the indication information is predefined or received from an external device.

9. An apparatus comprising:
a receiver that:
receives, from a user equipment (UE), a random access preamble sequence of a plurality of random access preamble sequences, wherein each random access preamble sequence of the plurality of random access preamble sequences is mapped to corresponding indication information, the random access preamble sequence to establish a random access channel is for an uplink transmission and comprises implicitly indicates the indication information corresponding to the random access preamble sequence; and
without transmitting a response to the reception of the random access preamble sequence, receives uplink information separate from the random access preamble sequence based on the indication information in the random access preamble sequence, wherein the indication information indicates at least two features selected from a group comprising a transmission resource assignment, a new data indicator, a transmit power control command, a modulation and coding scheme reference signal, and an acknowledgement and non-acknowledgement resource assignment corresponding to a respective random access preamble sequence of the plurality of random access preamble sequences.

10. The apparatus of claim 9, further comprising a transmitter that transmits acknowledgement or non-acknowledgement feedback information corresponding to the reception of the uplink information.

11. The apparatus of claim 9, wherein the uplink information is received using a multiple access code.

12. The apparatus of claim 9, wherein the uplink information is scrambled by a scrambled code.

13. A method of a base station, the method comprising:
receiving, from a user equipment (UE), a random access preamble sequence of a plurality of random access preamble sequences, wherein each random access preamble sequence of the plurality of random access preamble sequences is mapped to corresponding indication information, the random access preamble sequence to establish a random access channel is for an uplink transmission and implicitly indicates the indication information corresponding to the random access preamble sequence; and without transmitting a response to the reception of the random access preamble sequence, receiving uplink information separate from the random access preamble sequence based on the indication information in the random access preamble sequence, wherein the indication information indicates at least two features selected from a group comprising a transmission resource assignment, a new data indicator, a transmit power control command, a modulation and coding scheme reference signal, and an acknowledgement and non-acknowledgement resource assignment corresponding to a respective random access preamble sequence of the plurality of random access preamble sequences.

14. The method of claim 13, wherein the uplink information comprises one or more of control information and data information.

15. The method of claim 14, wherein the control information comprises one or more of a remote unit identification, a buffer status report, and a hybrid automatic repeat request process number.

16. The method of claim 13, wherein a mapping relationship between the random access preamble sequence and the indication information is predefined or transmitted.

17. The method of claim 13, further comprising transmitting acknowledgement or non-acknowledgement feedback information corresponding to the reception of the uplink information.

* * * * *